United States Patent [19]

Kruger

[11] 4,291,310
[45] Sep. 22, 1981

[54] ADAPTIVE TWO-DIMENSIONAL NULL FORMING RECEIVING ANTENNA SYSTEM

[75] Inventor: Bradford E. Kruger, Woodland Hills, Calif.

[73] Assignee: International Telephone and Telegraph Corporation, New York, N.Y.

[21] Appl. No.: 108,798

[22] Filed: Dec. 31, 1979

[51] Int. Cl.³ .............................................. G01S 13/00
[52] U.S. Cl. ........................ 343/16 R; 343/100 SA; 343/854
[58] Field of Search ............. 343/16 R, 120, 100 SA, 343/854

[56] References Cited

U.S. PATENT DOCUMENTS 4,034,376  7/1977  Barton .............................. 343/16 R Primary Examiner—Theodore M. Blum
Attorney, Agent, or Firm—William T. O'Neil

[57] ABSTRACT

An electronic two-dimensional scanning array system with a two-dimensional interferometer array arrangement associated therewith is disclosed. The scanning array is used for transmitting a pencil beam, and the interferometer arrays are employed in receiving, array signal processing also being employed. The azimuth interferometer array consists of two sub-arrays, one on each side of the scanning transmitting array. The elevation interferometer array is likewise divided into two sub-arrays, one across the top and the other across the bottom of the scanning transmitting planar array. Accordingly, null responses in azimuth and elevation are provided. Phasors, which may be controlled by tracking functions, steer the center and nulls of the interferometer receive beam together in such a manner that the maximum improvement of the ratio of array-signal-process received target power to received power from an interfering source angularly separated from the interferometer center beam is achieved.

10 Claims, 4 Drawing Figures

ADAPTIVE TWO-DIMENSIONAL NULL FORMING RECEIVING ANTENNA SYSTEM

BACKGROUND OF THE INVENTION

1. Field of the Invention

The present invention relates to radar systems generally and more particularly to radar systems which are relatively insensitive to jamming.

2. Description of the Prior Art

In the prior art, the concept of array-signal-processing has been developed and is described in the patent and other technical literatures. For example, in U.S. Pat. No. 4,034,376, entitled Radio Direction Finder with Array Element Signal Processing, the concept is described in a typical arrangement including a linear array of equally spaced elements. The array is passively operated; that is, it receives only. Radio frequency signals emanating from a mobile craft, either as a result of separate illumination or as a result of signals generated and radiated from the craft, provide signals at the antenna elements with a phase difference between successive elements in accordance with the angle of arrival of the RF pulses. Basically, the array is sequentially sampled (scanned) so that this phase or arrival time difference can be converted to a time-base or frequency-base signal. The array signal processing technique is applicable in multi-element linear or planar arrays, such as would commonly be employed as phased-array scanners.

Range and angle tracking are, of course, well-known, and those of skill in this art are familiar with the techniques. Angle tracking employing inertialess beam pointing techniques has come into prominence in recent years, and systems are known in which the rapidly variable beam pointing angle thus made possible can facilitate the time-shared tracking of a number of targets contemporaneously.

One of the problems in tracking a hostile airborne vehicle from a ground or shipboard position is the possible presence of a jammer or interfering source at an angle removed from, but relatively close to, the target of interest. Discrimination on the basis of frequency and so-called frequency hopping have been employed to ameriorate or dilute the effectiveness of such an interfering source. Frequently, however, broad-band interfering signals arriving on a "one-way" path cannot be adequately dealt with by such measures.

Radiation pattern tailoring or control is difficult and/or expensive to apply effectively, at least in accordance with classical approaches.

The manner in which the present invention provides a relatively simple arrangement for nulling an interfering source under the aforementioned circumstances will be evident as this descriptin proceeds. The accomplishment of the general objective of the invention will be recognized as this description proceeds.

SUMMARY OF THE INVENTION

It may be said to have been the general objective of the present invention to provide a relatively simple and inexpensive, yet effective, arrangement for the nulling of an interfering source such as a jammer, where the said interfering source is spaced angularly by a relatively small amount from the angular coordinates of a target of interest which is being tracked, for example.

A typical structure according to the invention includes a pencil-beam transmitting arrangement for illuminating a selected target. A separate receiving array is provided, the preferred form of which is two sub-arrays arranged on opposite sides of the transmitting array for each coordinate (Az and El). These sub-arrays are connected in an interferometer arrangement for receiving only and provide a receiving pattern of angularly spaced multiple lobes with deep nulls separating them. Typically, such a pair of sub-arrays operative as an interferometer arrangement generates this pattern because of the physical spacing between the two arrays. It is known that, from such judicially spaced sources, the separate fields generated (or extant in the receiving situation) result from distributed cancellations and augmentations.

By judicious selection of the width of the illuminating beam from the transmitting array as compared to the main lobe-to-null spacing in the interferometer receiving pattern, and by appropriate independent receiving interferometer pattern steering, and by application of the null-forming capability of the aforementioned array-signal processing technique, the received target signal power to jamming signal power ratio can be improved. The pointing angle as controlled through a bank of phasors can be made to steer the interferometer receive beams (lobes) together with the nulls spaced therefrom in angle in such a manner that the maximum ratio of array-signal-process received target power to received interfering source power is achieved. That the center of a receiving array lobe may be somewhat offset from the transmit beam is not of great consequence as long as the received lobe is not required to be pointed so much away from the illuminated target as to seriously diminish received power therefrom.

It will be seen from the foregoing that the structure of the invention is or may be described as a spatial angle filter operative substantially independent of the interfering source frequency, bandwidth, or modulation characteristics.

The details of a system according to the invention in typical form will be understood as this description proceeds.

DETAILED DESCRIPTION

Figure 1:
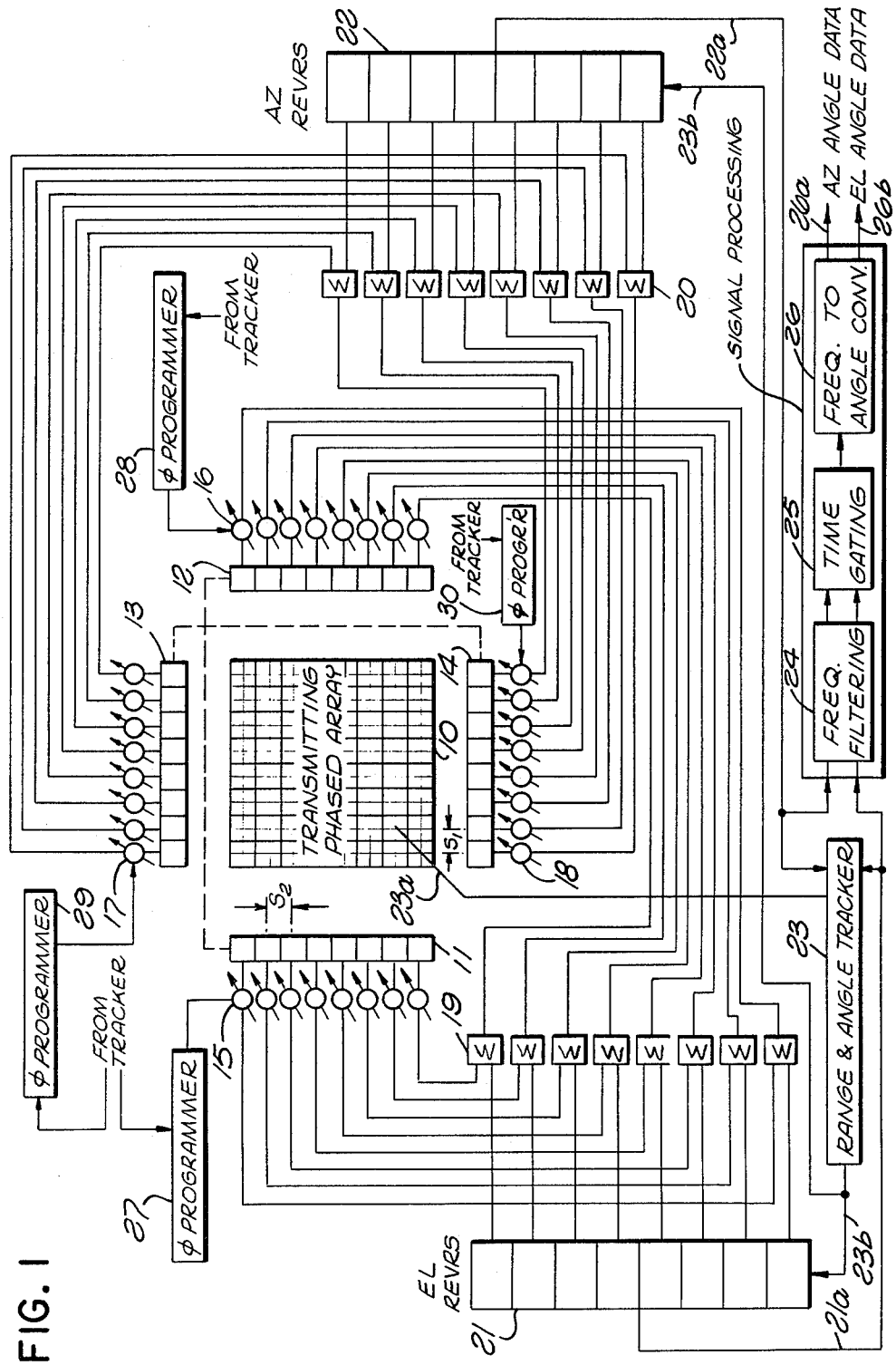
FIG. 1 is a schematic block diagram of the major elements and their interconnection in a system according to the invention.

Referring now to FIG. 1, a schematic block diagram of a typical system in accordance with the invention is depicted. A transmitting antenna, for example a phased array 10, is shown, it being understood that this antenna is conventional in this art and forms a pencil beam and may be directed in two angular coordinates of space by tracking apparatus 23. Lead 23a from range and angle tracker 23 represents the conventional connections which would be required between 10 and 23 for the steering of the pencil beam generated by the array 10. The range and angle tracker 23 may be assumed to include the transmitter, receiver and control functions normally associated with an inertialess pencil beam two-coordinate tracker. Such apparatus is well-known per se, and well understood by those of skill in this art.

In the system according to the invention, whereas the array 10 is used only for transmitting, it will be noted that there are two opposite pairs of linear arrays adjacent to the perimeter of the transmitting array 10. These are 11 and 12 as a pair producing an interferometer beam pattern in the azimuth plane. Similarly, arrays 13 and 14 produce an interferometer pattern in the elevation plane. Since both the transmitted pencil beam and the two interferometer beams generated for receiving are electronically steered, all may be carried essentially by the same physical mounting, the latter being mechanically rotatable, if desired. The electronic beam steering of transmit and interferometer receive beams may be thought of as effective over a solid sector of space about the normal of the transmitting array 10.

Figure 2:
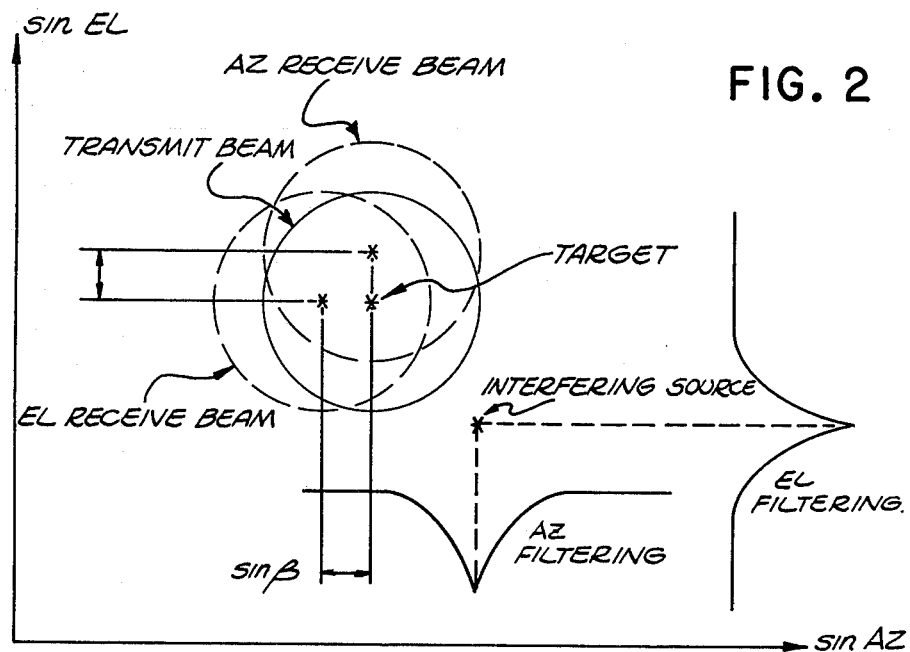
FIG. 2 is a graphic spatial representation of a transmit beam, two receiving interferometer lobes, and the spatial null produced in each coordinate, all in a remote plane generally normal to the transmit direction.
Figure 3:
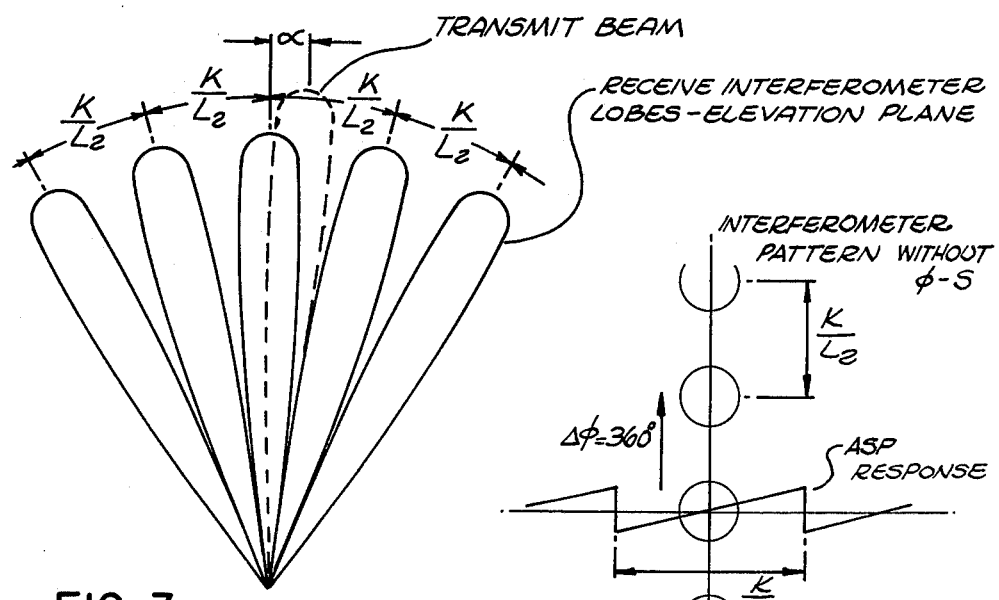
FIG. 3 is a typical interferometer beam pattern (in the elevation plane, for example) according to the receiving characteristic of the system of the invention, plus the single transmit beam.
Figure 4:
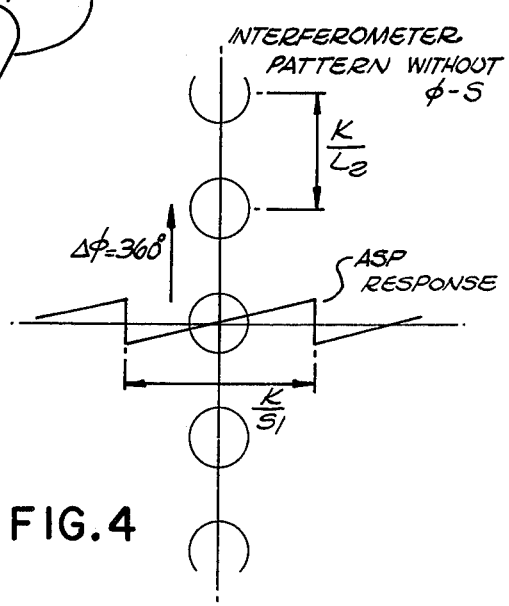
FIG. 4 is a representation in the elevation plane of the top and bottom array receive interferometer structure and the azimuth ASP (Array signal processing) response of those two arrays.

Before proceeding further with description of FIG. 1, it may be helpful to explain FIGS. 2, 3 and 4. FIG. 2 is intended to depict a typical beam relationship, the transmit and two receiving beam cross-sections being idealized as circles as illustrated. The azimuth and elevation coordinates in a particular plane as represented in FIG. 2 are the sine of Az and the sine of El, respectively.

Referring now to FIG. 3, the transmit beam in either the azimuth or the elevation plane is typically represented as shown and the multiple interferometer beam pattern from the interferometer array linear pair for either space coordinate (but illustrated for the elevation plane) is also typically represented and identified. The main lobe of the interferometer beam pattern will be seen to overlap the pattern of the transmit beam, but offset by angle α for this example. In FIG. 4, the ASP response refers to the ASP-processed output of the combined two arrays, depending on where a target signal is angularly located. As per the characteristics of an ASP array, the target may be unambiguously located over an angle limited by the spacing ($S_1$) of the individual receiving array elements. Targets located at azimuth angles greater than those corresponding to $\pm K/2S_1$ degrees are measured as apparently within $\pm K/2S_1$ degrees.

In FIG. 2, the arbitrarily depicted spacing between transmit and receiving interferometer main beam centers is identified as β in azimuth and α in elevation. The center of the transmit beam may be assumed to be precisely on target, since the illumination of the target is controlled by the hereinbefore mentioned tracking mechanism 23, etc. The reason for an offset between the center of the transmit and receiving beams is to permit maximization of the ratio of the signal received from the target to the jamming signal reduced by both the receive antenna gain fall-off and the ASP null action. The interferometer arrays pairs, for example 11 and 12, are "steered" by phased programmers 27 and 28, respectively. These programmers control the banks of phase shifters 15 and 16 to locate the interferometer beam in one angular space coordinate. Similarly, in the other space coordinate interferometer array pairs 13 and 14 are controlled by phase programmers 29 and 30, respectively, operating on the phase shifter banks 17 and 18 as shown. The control of these phase programers is in accordance with a signal received from tracker 23 in which the ratio of array signal processed received power to received interfering source power is maximized by electronically slightly modifying the pointing angle of the said interferometer pattern.

As is well understood in the existing array signal processing technology, the received signals of each individual element of any of the four linear interferometer arrays must be separately processed. Accordingly, summer circuits, for example 19, contain N individual summers where N equals the number of elements of each interferometer half-array 11 (for example). Each summer of the bank 19 receives the output (received) signal from a corresponding element in array 12. Receiver 21 will be seen to contain separate receivers or receiver channels, one for each summer circuit. The same applies to summer bank 20 and the elements of arrays 13 and 14, feeding the separate channels of the elevation receiver bank 22.

Received signals at the elements of a multi-element receiving array do not arrive simultaneously. Depending upon the angle of the received signal wave front with respect to the array normal, there will be a detectable phase (time) difference in the individual element receptions. In array signal processing, a form of passive scanning, i.e., sampling this group of received signals successively and repetitively, is involved. In the process, a frequency or time base is generated which is outputted from the receivers 21 and 22 via leads 21a and 22a respectively. These frequency or timed components then may be subjected to filtering in 24 and in time gating in 25, and they are ultimately converted to an angle analog in 26. The result is elevation and azimuth output signals 26a and 26b representing target coordinates for tracking, display or other purposes. The leads 23b may be thought of as conveying the signal processing sampling function to the receiver banks 21 and 22, and also whatever range gating or tracking functions may also be incidentally included in the system controlled from range and angle tracker 23.

The foregoing comments in respect to array signal lprocessing per se are intended only as a brief summary of the principles thereof, since the details of instrumentation for an array signal processing system are known in this art. Reference is again made to U.S. Pat. No. 4,034,376 as background in respect to array signal processing.

From the foregoing, the invention will be seen to offer relatively simple means for effectively nulling signals received from an interfering source which, in a practical environment, is usually close in angle to the vector of a target which is to be tracked. In that context, the invention may be thought of as an adaptive angular filter.

Modifications and variations of this specific instrumentation disclosed and discussed hereinbefore will suggest themselves to those of skill in this art; consequently, it is not intended that the scope of the invention should be limited to the drawings or this description. The drawings and description are to be regarded as typical and illustrative only.

What is claimed is:

1. A radar system capable of minimizing its receiving response to an interfering radiation source angularly separated from a target of interest, comprising:

first means for illuminating said target with radiant energy;

second means comprising at least one interferometer array having a pair of sub-arrays each with a plurality of elements mounted one on a first side of said first means and the other on the side opposite said first side, said sub-arrays being connected to provide an interferometer pattern having a main lobe and angularly spaced nulls in a first spatial angular coordinate on both sides of said main lobe;

array processing signal receiver means responsive to signals received through said second means as a result of illumination by said first means to provide target angle information;

third means responsive to said receiver means for developing a variable phase shift program for said sub-array elements to steer a null in said interferometer pattern within said first spatial angular coordinate so as to substantially eliminate received energy from said interfering radiation source, echo signals from said target being within said main lobe.

2. Apparatus according to claim 1 in which said second means comprises a first pair of said sub-arrays having one sub-array on said first side of said first means and the other on the side opposite said first side of said first means for forming said interferometer pattern in a first angular coordinate, and including a second pair of said sub-arrays having one sub-array on a second side of said first means orthogonal with said first side and the other sub-array of said second pair on the side of said first means opposite said second sub-array one side for producing a corresponding interferometer pattern in a second angular coordinate orthogonal to said first angular coordinate, and in which said receiver means comprises separate receiving channels for each of said sub-array sets and said third means comprises means responsibe discretely to said separate receiving channels for developing separate phase programs for said sub-array sets to steer the corresponding nulls in said first and second angular coordinates.

3. Apparatus according to claim 1 in which said first means comprises a two dimensional phased array for forming a steerable pencil beam for said illumination and radar tracking means responsive to said receiver means for steering said pencil beam for illumination of said target.

4. Apparatus according to claim 1 in which said interferometer sub-arrays each comprises a linear array of a plurality of elements and said third means includes a controllable phase shifter discretely connected to each of said elements, and including means for controlling the phases of each sub-array differentially with respect to the opposite sub-array of each of said pairs of sub-arrays.

5. Apparatus according to claim 2 in which said first means comprises a two dimensional phased array for forming a steerable pencil beam for said illumination and radar tracking means responsive to said receiver means for steering said pencil beam for illumination of said target.

6. Apparatus according to claim 2 in which said interferometer sub-arrays each comprises a linear array of a plurality of elements and said third means includes a controllable phase shifter discretely connected to each of said elements, and including means for controlling the phases of each sub-array differentially with respect to the opposite sub-array of each of said pairs of sub-arrays.

7. Apparatus according to claim 3 in which said interferometer sub-arrays each comprises a linear array of a plurality of elements and said third means includes a controllable phase shifter discretely connected to each of said elements, and including means for controlling the phases of each sub-array differentially with respect to the opposite sub-array of each of said pairs of sub-arrays.

8. Apparatus according to claim 4 in which each of said phase shifters corresponding to an element of one of said sub-arrays provides one input to a discrete summer, the other input to said summer being provided by the corresponding phase shifter in the opposite sub-array, there being $\eta$ phase shifters corresponding to each pair of sub-arrays and $\eta$ elements in each sub-array, the outputs of said summers each providing a receiver channel input to said array processing receiver.

9. Apparatus according to claim 2 in which each of said phase shifters corresponding to an element of one of said sub-arrays provides one input to a discrete summer, the other input to said summer being provided by the corresponding phase shifter in the opposite sub-array, there being $\eta$ phase shifters corresponding to each pair of sub-arrays and $\eta$ elements in each sub-array, the outputs of said summers each providing a receiver channel input to said array processing receiver.

10. Apparatus according to claim 3 in which each of said phase shifters corresponding to an element of one of said sub-arrays provides one input to a discrete summer, the other input to said summer being provided by the corresponding phase shifter in the opposite sub-array, there being $\eta$ phase shifters corresponding to each pair of sub-arrays and $\eta$ elements in each sub-array, the output of said summers each providing a receiver channel input to said array processing receiver.

* * * * *